United States Patent
Cottet

(10) Patent No.: US 7,636,054 B2
(45) Date of Patent: Dec. 22, 2009

(54) INDICATOR FOR PILOTING AN AIRCRAFT, DESIGNED TO PROVIDE A POWER PARAMETER OF AT LEAST ONE TURBOPROP ENGINE OF SAID AIRCRAFT

(75) Inventor: Jean-Philippe Cottet, Auzielle (FR)

(73) Assignee: Airbus, Blagnac (FR)

( * ) Notice: Subject to any disclaimer, the term of this patent is extended or adjusted under 35 U.S.C. 154(b) by 213 days.

(21) Appl. No.: 11/994,968

(22) PCT Filed: Jul. 13, 2006

(86) PCT No.: PCT/FR2006/001709

§ 371 (c)(1),
(2), (4) Date: Jan. 7, 2008

(87) PCT Pub. No.: WO2007/010118

PCT Pub. Date: Jan. 25, 2007

(65) Prior Publication Data

US 2008/0198040 A1 Aug. 21, 2008

(30) Foreign Application Priority Data

Jul. 18, 2005 (FR) .................................. 05 07568

(51) Int. Cl.
G01C 21/00 (2006.01)
(52) U.S. Cl. ........................ 340/971; 340/945; 340/946; 701/9; 701/14
(58) Field of Classification Search .................. 340/971, 340/945, 946, 963, 969, 980; 701/3, 4, 7, 701/9, 14, 29; 244/53 B, 4 R, 17.11; 345/619, 345/649
See application file for complete search history.

(56) References Cited

U.S. PATENT DOCUMENTS

| 3,181,353 | A | 5/1965 | Brahm |
| 3,721,120 | A | 3/1973 | Howell |
| 5,886,649 | A | 3/1999 | Francois |
| 6,411,869 | B2 * | 6/2002 | Permanne ...................... 701/3 |
| 7,031,812 | B1 * | 4/2006 | Pettigrew et al. .............. 701/14 |
| 7,212,942 | B2 * | 5/2007 | Vollum ....................... 702/127 |
| 7,322,178 | B2 * | 1/2008 | Simoni .................... 60/39.281 |
| 7,414,544 | B2 * | 8/2008 | Oltheten et al. ............. 340/946 |
| 2004/0215375 | A1 | 10/2004 | Andre | |

OTHER PUBLICATIONS

International Search Report dated Nov. 22, 2006.

* cited by examiner

Primary Examiner—Davetta W Goins
(74) Attorney, Agent, or Firm—Dickinson Wright PLLC

(57) ABSTRACT

The invention concerns a piloting indicator (1) comprising data sources (2) which determine the parameter values concerning the propeller and the turbine of the turboprop, as well as the parameter values concerning the aircraft, processing means (3) which calculate, based on said values, a power parameter which takes into account the ratio between the current power of the turboprop engine and the maximum power obtained without air bleed at sea level in standard atmosphere, and display means (5) which display, on a viewing screen (7), at least one characteristic symbol (11) illustrating said power parameter.

5 Claims, 2 Drawing Sheets

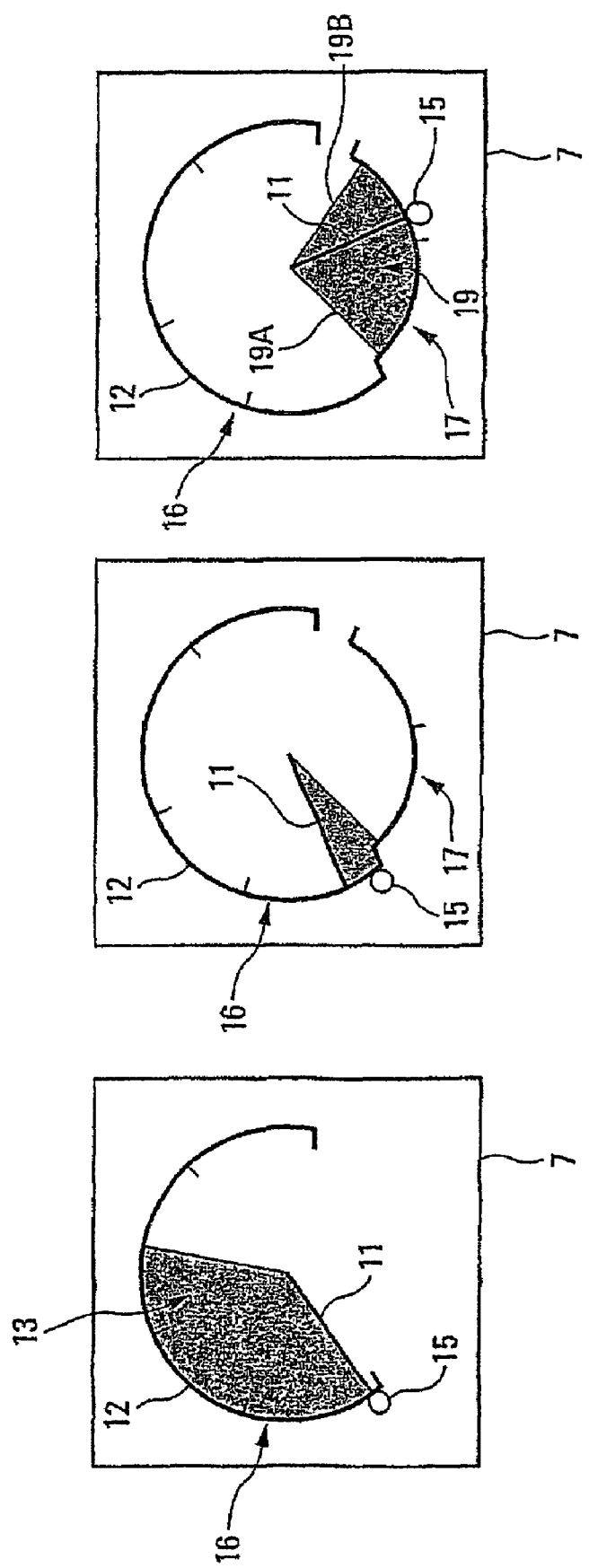

INDICATOR FOR PILOTING AN AIRCRAFT, DESIGNED TO PROVIDE A POWER PARAMETER OF AT LEAST ONE TURBOPROP ENGINE OF SAID AIRCRAFT

The present invention relates to a flight control indicator for an aircraft, intended to provide a power parameter pertaining to at least one turboprop of said aircraft, particularly of a transport airplane.

It is known that a turboprop comprises a gas turbine which drives one or more propellers via a reduction gearbox.

It is an object of the present invention to display an engine control parameter for such a turboprop, which parameter can also be used in the customary way by an appropriate engine management system in order to operate said turboprop.

In general, a flight control indicator such as this comprises:
- data sources;
- data processing means for processing the data received from said data sources; and
- display means capable of displaying, on at least one display screen, data from said processing means, such as said engine control parameter.

It will be noted that one of the difficulties encountered in formulating such an engine control parameter is that a turboprop has a normal range of use that covers various propeller speeds. The parameter customarily used for these purposes in this type of turboprop is the torque on the propeller shaft. However, a parameter such as this is representative of the engine power only at a constant rotational speed. It is therefore not able to indicate how much power there is across the normal range of use of said turboprop.

It is an object of the present invention to overcome these disadvantages. The invention relates to a flight control indicator that is particularly legible and easy to understand, which is intended to provide a power parameter pertaining to at least one turboprop of an aircraft, and making it possible coherently to provide feedback regarding the power throughout the operating range of the turboprop, that is to say from maximum direct traction to maximum drag in reverse thrust mode.

To these ends, according to the invention, said flight control indicator of the type comprising:
- data sources;
- data processing means for processing the data received from said data sources; and
- display means capable of displaying, on at least one display screen, data from said processing means, is notable in that:
- said data sources additionally determine the values of parameters relating to the propeller and to the turbine of the turboprop, together with the values of parameters relating to the aircraft;
- said processing means calculate, from these values, a power parameter that takes account of the ratio between the current power of the turboprop and the maximum power obtained without air bleed at sea level in a standard atmosphere; and
- said display means display, on the display screen, at least one characteristic sign illustrating said power parameter.

As a preference, said processing means calculate said power parameter PIT using the following expression:

$$PIT = 100.A.(TQc.NPc - PWRr)/(PWRmax - PWRr)$$

in which:
- A corresponds to the sign of $\beta - \beta 0$, $\beta$ representing the current measured angle of incidence of the blades of the propeller of the turboprop, and $\beta 0$ representing the angle of incidence of said blades on the ground at idle;
- TQc represents the current torque on the shaft of the free turbine;
- NPc represents the current measured speed of the propeller of the turboprop, the product TQc.NPc forming said current power;
- PWRmax represents said maximum power; and
- PWRr represents a predetermined reference power.

This power parameter PIT takes account in particular:
- of a reference power PWRr which makes it possible to avoid the indication hopping in the vicinity of the low powers;
- of the sign of $\beta - \beta 0$ which allows the operation to be represented in airbrake and windmilling mode (negative traction), which is characteristic of the turboprop operating in reverse thrust mode; and
- of the value 100 which makes it possible to obtain an indication as a percentage of maximum power, as specified hereinbelow.

Thus, by virtue of the invention, said flight control indicator provides the pilot with a power parameter PIT which is able to perform the following functions:
- to indicate, at any moment in flight, the power developed by the turboprop;
- to indicate the reserve of power available with respect to maximum power;
- to provide the pilot with enough information regarding the behavior of this power in transient phases; and
- to simplify the usual limits on maximum rotational speed or maximum engine torque by providing the pilot with a single limiting indication.

It will be noted that said indicator really is a flight control indicator rather than a simple engine monitoring indicator because it provides an operational power parameter that takes account of how the turboprop is integrated into the aircraft, and does so during operation.

In a preferred embodiment, said display means display, on said display screen, a dial which is graduated in percentages and which is fitted with a pointer representing said characteristic sign, and of which the position on said dial is representative of said power parameter calculated by said processing means.

Furthermore, advantageously, said dial comprises a first part relating to the turboprop operating in traction mode and a second part relating to said turboprop operating in reverse thrust mode.

The flight control indicator according to the invention therefore allows said power parameter to be read simply, quickly and in a way that is easy to understand.

In one particular embodiment, said flight control indictor additionally comprises a monitoring means for monitoring the sign of $\beta - \beta 0$ and for detecting when this sign turns negative, and said display means are formed in such a way as to display said second part of the dial on said display screen only when said monitoring means has detected that said sign has turned negative.

The figures of the attached drawing will make it easy to understand how the invention may be embodied. In these figures, references that are identical denote elements that are similar.

FIGS. 3A, 3B and 3C illustrate the same display screen of a flight control indicator according to the invention, in three different and successive situations, namely, respectively, when operating in traction mode, during a transitional phase, and when a turboprop is operating in reverse thrust mode.

Figure 1:
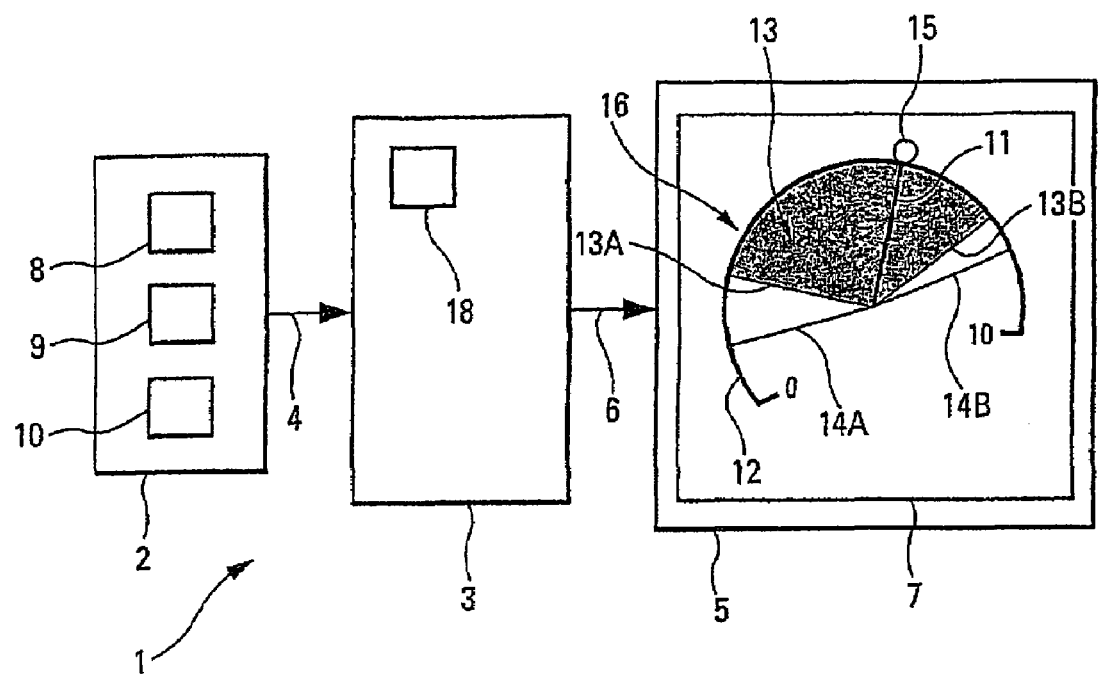
FIG. 1 is a block diagram of a flight control indicator according to the invention.

The flight control indicator 1 according to the invention and depicted schematically in FIG. 1 is intended to provide, on an aircraft, particularly on a transport airplane, a power parameter pertaining to at least one turboprop, not depicted, of said aircraft. A turboprop such as this comprises, in the usual way, a gas turbine which drives at least one propeller via a reduction gearbox associated with a propeller shaft.

To these ends, said flight control indicator 1, which is an on-board indicator, comprises in a known way.

a set 2 of data sources supplying the data specified hereinbelow:

data processing means 3 for processing the data received from said set 2 of data sources via a link 4; and display means 5 which are connected by a link 6 to said means 3 and which are capable of displaying information from said processing means 3 on at least one display screen 7.

According to the invention:

said set 2 of data sources comprises:

means 8 for determining the values of parameters (specified hereinbelow) relating to the propeller of the turboprop, means 9 for determining the values of parameters (specified hereinbelow) relating to the turbine of the turboprop, and means 10 for determining the values of parameters (specified hereinbelow) relating to the aircraft on which said turboprop is mounted;

said processing means 3 calculate, from the values received from said set 2 of data sources, a power parameter PIT which takes account of the ratio between the current power of the turboprop PWRc and the maximum power PWRmax obtained without an air bleed at sea level in a standard atmosphere for TOGA (the English-language acronym for "Take-Off/Go-Around") conditions; and said display means 5 display, on the display screen 7, at least one characteristic sign 11 illustrating said power parameter PIT as specified hereinbelow.

As a preference, said processing means 3 calculate said power parameter PIT using the following expression:

$$PIT = 100.A.(TQc.NPc - PWRr)/(PWRmax - PWRr)$$

in which:

A corresponds to the sign of $\beta - \beta 0$. $\beta$ represents the current measured angle of incidence (measured using an appropriate measurement means that forms part of the means 8) of the blades of the propeller of the turboprop, and $\beta 0$ represents a predetermined value representing the angle of incidence of said blades on the ground at idle;

TQc represents the current torque on the shaft of the free turbine;

NPC represents the measured current speed (measured using an appropriate measurement means forming part of the means 8) of the propeller of the turboprop. The product TQc.NPc forms the aforementioned current power PWRc;

PWRmax represents said maximum power; and

PWRr represents a predetermined reference power.

This power parameter PIT takes account in particular:

of a reference power PWRr which makes it possible to avoid the indication hopping (on the display) in the vicinity of the low powers;

of the sign of $\beta - \beta 0$ which allows the operation to be represented in airbrake and windmilling mode (negative traction) of the turboprop, which is characteristic of operating in reverse thrust mode; and of the value 100 which makes it possible to obtain an indication as a percentage of maximum power, as specified hereinbelow.

Thus, by virtue of the invention, said flight control indicator 1 provides the pilot with a power parameter PIT which is able to perform the following functions:

to indicate, at any moment in flight, the power developed by the turboprop;

to indicate the reserve of power available with respect to maximum power PWRmax;

to provide the pilot with enough information regarding the behavior of this power in transient phases; and to simplify the usual limits on maximum rotational speed or maximum engine torque by providing the pilot with a single limiting indication.

It will be noted that said indicator 1 according to the invention really is a flight control indicator rather than a simple engine monitoring indicator because it provides an operational power parameter PIT that takes account of how the turboprop is integrated into the aircraft (in particular, thanks to the measurements taken using the means 10), and does so during operation (in particular by virtue of the measurements taken using the means 8 and 9).

In one particular embodiment, said means 8, 9 and 10 supply at least the following items of data, allowing the processing means 3 to calculate the power parameter PIT:

data from the anemometric units;

the status of the automatic throttle;

the status of the air bleeds;

engine thermodynamic cycle status parameters; and the propeller speed.

Said processing means 3 determine said current torque TQc in the usual way.

As can be seen from the figures, said display means 5 display, on said display screen 7, a dial 12 which is graduated in percentages (from 0% to 100%) and the maximum ("10", that is to say 100%) of which represents said maximum power PWRmax. The dial 12 has a pointer 11, for example green in color, of which the position on said dial 12 indicates the value of said power parameter PIT as determined by said processing means 3. FIG. 1 also depicts. (in gray), a circular sector 13 of said dial 12, which is delimited by limits 13A and 13B and which illustrates the normal range of operation of the turboprop. In order to differentiate this circular sector 13 from the background of the dial 12, said circular sector 13 is, for example, of a color or a darkness that differs from that of said background.

The flight control indicator 1 according to the invention therefore allows said power parameter PIT to be read simply, quickly and in a way that is easy to understand.

The display screen 5 additionally comprises, on the graduated dial 12:

limits 14A and 14B which indicate:

the value of PIT at idle flight at the minimum rotational speed of the propeller and the maximum value of PIT (the maximum available power at the flight point=maximum torque×maximum rotational speed); and a symbol 15, for example a blue circle, which indicates the demanded power, namely the thrust lever angle, often known by its English-language abbreviation of "TLA".

Figure 2:
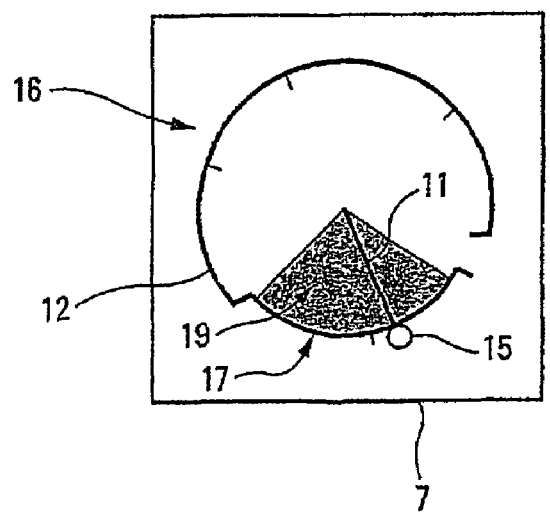
FIG. 2 illustrates a display screen of a flight control indicator according to the invention, when operating in reverse thrust mode.

Furthermore, said dial 12 comprises, as depicted in FIG. 2, an upper part 16 which relates to the turboprop operating in traction mode, as depicted in FIG. 1 for example, and a lower part 17 which relates to said turboprop operating in reverse thrust mode.

In one particular embodiment, said flight control indicator 1 additionally comprises a monitoring means 18, which is for example incorporated into the processing means 3 and which is intended to monitor the sign of $\beta$-$\beta 0$ so as to emit a warning signal when this sign turns negative. Furthermore, said display means 5 are formed in such a way as to display said lower part 17 of the dial 12 on said display screen 7 only when said monitoring means 18 has detected that said sign of $\beta$-$\beta 0$ has turned negative, as this is representative of negative traction. This is, for example, the case in the example of FIG. 2 which therefore illustrates operation in reverse traction mode.

The part 17 of the dial 12 is also graduated and may comprise a circular sector 19 (delimited by limits 19A and 19B) which is similar, for the reverse thrust mode of operation, to said circular section 13 provided for the traction mode of operation. However, the upper part 17 is always displayed irrespective of the mode of operation of the turboprop.

The flight control indicator 1 according to the invention therefore provides coherent feedback concerning the power of the turboprop throughout the range of operation thereof, that is to say from maximum direct traction to maximum drag in reverse thrust mode.

FIGS. 3A, 3B and 3C depict three successive situations corresponding respectively to:
operation in traction mode;
a transient phase (between operation in traction mode and operation in reverse thrust mode); and
operation in reverse thrust mode.

It is also possible to provide a characteristic sign (not depicted), for example a red tab, on the part 16 of the dial 12, to provide an indication of the limit on the engine, by illustrating the limit of the power parameter PIT that corresponds to one of the limits on the engine (torque or power).

The invention claimed is:

1. A flight control indicator for an aircraft, intended to provide a power parameter pertaining to at least one turboprop of said aircraft, said turboprop comprising a gas turbine driving the rotation of at least one propeller, said flight control indicator (1) comprising:
data sources (2) which determine at least the values of parameters relating to the aircraft;
data processing means (3) for processing the data received from said data sources (2); and
display means (5) capable of displaying, on at least one display screen (7), data from said processing means (3), and at least one characteristic sign (11) illustrating said power parameter, wherein:
said data sources (2) additionally determine the values of parameters relating to the propeller and to the turbine of the turboprop;
said processing means (3) calculate, from the values determined by said data sources (2), a power parameter that takes account of the ratio between the current power of the turboprop and the maximum power obtained without air bleed at sea level in a standard atmosphere; and
said processing means (3) calculate said power parameter PIT using the following expression:

$$PIT = 100.A.(TQc.NPc - PWRr)/(PWRmax - PWRr)$$ in which:

A corresponds to the sign of $\beta$-$\beta 0$, $\beta$ representing the current measured angle of incidence of the blades of the propeller of the turboprop, and $\beta 0$ representing the angle of incidence of said blades on the ground at idle;
TQc represents the current torque on the shaft of the free turbine;
NPc represents the current measured speed of the propeller of the turboprop, the product TQc.NPC forming said current power;
PWRmax represents said maximum power; and
PWRr represents a predetermined reference power.

2. The flight control indicator as claimed in claim 1, wherein said display means (5) display, on said display screen (7), a dial (12) which is graduated in percentages and which is fitted with a pointer (11) representing said characteristic sign, and of which the position on said dial (12) is representative of said power parameter calculated by said processing means (3).

3. The flight control indicator as claimed in claim 2, wherein said dial (12) comprises a first part (16) relating to the turboprop operating in traction mode and a second part (17) relating to said turboprop operating in reverse thrust mode.

4. The flight control indicator as claimed in claim 2, wherein it additionally comprises a monitoring means (18) for monitoring the sign of $\beta$-$\beta 0$ and for detecting when this sign turns negative, and said display means (5) are formed in such a way as to display said second part (17) of the dial (12) on said display screen (7) only when said monitoring means (18) has detected that said sign has turned negative.

5. An aircraft, wherein it comprises a flight control indicator (1) such as the one specified in claim 1.

* * * * *